United States Patent [19]

Wadell

[11] Patent Number: 5,445,840
[45] Date of Patent: Aug. 29, 1995

[54] FOLDING OF FOOD PIECES

[75] Inventor: Lars G. A. Wadell, Aengelholm, Sweden

[73] Assignee: Nestec S.A., Vevey, Switzerland

[21] Appl. No.: 667,027

[22] Filed: Mar. 11, 1991

[30] Foreign Application Priority Data

Apr. 21, 1990 [EP] European Pat. Off. ............ 90107605

[51] Int. Cl.$^6$ ............................ A21D 8/02; A21C 9/08
[52] U.S. Cl. ...................................... 426/297; 426/496;
        426/502; 426/512; 425/383; 425/385
[58] Field of Search ............... 426/496, 502, 512, 297;
        425/383, 385

[56] References Cited

U.S. PATENT DOCUMENTS

| | | | |
|---|---|---|---|
| 628,449 | 7/1899 | Carr | 426/502 |
| 3,379,139 | 4/1968 | Lipinsky | 99/450.2 |
| 3,388,675 | 6/1968 | Marshall et al. | 99/450.6 |
| 3,669,007 | 6/1972 | Pulici | 99/450.1 |
| 3,690,248 | 9/1972 | Schafer | 99/450.2 |
| 3,690,895 | 9/1972 | Amadon | 426/502 |
| 3,865,963 | 2/1975 | Gugler | 426/297 |
| 4,520,035 | 5/1985 | Lamonica | 426/502 |
| 4,543,053 | 9/1985 | Jasniewiski | 426/502 |
| 4,638,729 | 1/1987 | Woodworth et al. | 99/450.2 |

FOREIGN PATENT DOCUMENTS 2308314  11/1976  France ............... 99/450.1

OTHER PUBLICATIONS

Webster's New Collegiate Dictionary, G. & C. Merriam Company, Springfield, Mass., 1975, p. 603.

Primary Examiner—Donald E. Czaja
Assistant Examiner—Anthony Weier
Attorney, Agent, or Firm—Vogt & O'Donnell

[57] ABSTRACT

Food pieces are folded by depositing a food piece onto a conveyor and onto a rotatable bar which is positioned above the conveyor surface. The bar has a perimeter shape which conforms to a half perimeter shape of the food piece and is initially positioned to extend parallel to the conveyor surface. After a food piece has been deposited on the bar and conveyor surface, the bar is rotated in an arc about a bar axis of rotation so that the bar lifts up and folds a half portion of the deposited food piece over onto another half portion of the food piece on the conveyor surface. The bar is rotated to return it to its initial position, and the conveyor surface is advanced to transport the folded food piece. A filling may be deposited on the deposited food piece prior to folding the food piece.

11 Claims, 2 Drawing Sheets

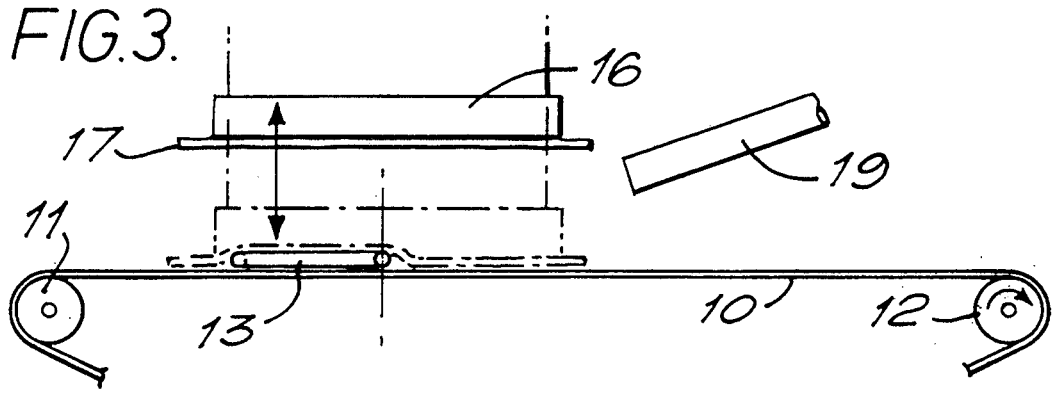
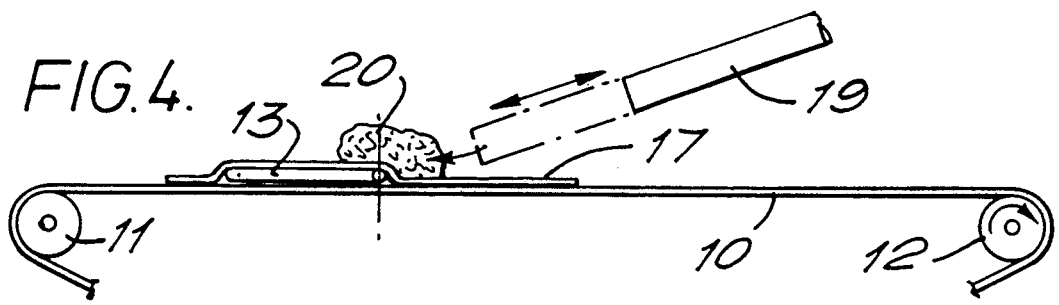
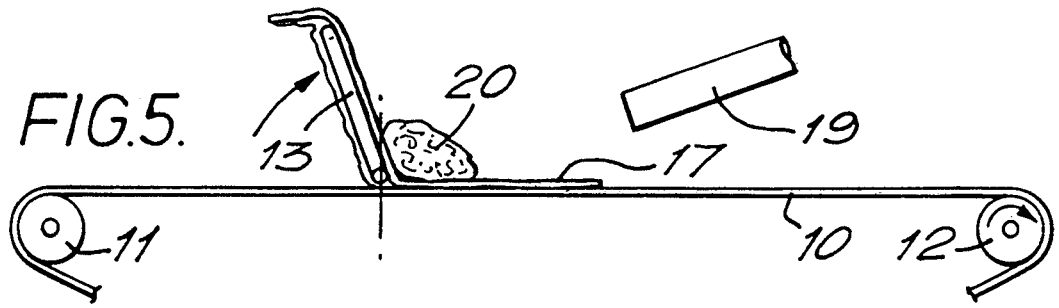
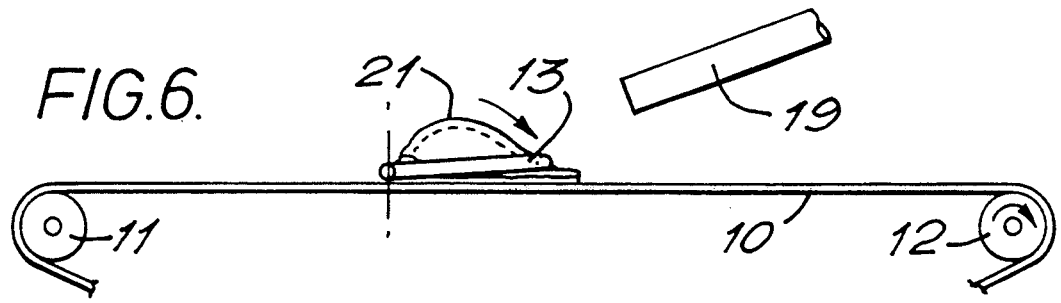
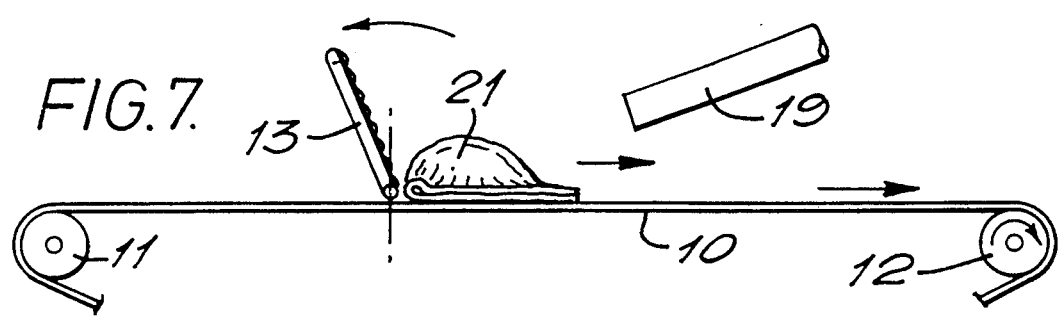

FOLDING OF FOOD PIECES

BACKGROUND OF THE INVENTION

The present invention relates to a folding process for a food piece and to a folding device therefor.

Certain food pieces such as pancakes or crepes still tend to be folded manually. This is, of course, time and labour consuming as well as unhygienic.

SUMMARY OF THE INVENTION

We have now devised a process which enables food pieces to be folded automatically which process is rapid and labour saving.

Accordingly, the present invention provides a process for folding a food piece on a conveyor adapted to advance intermittently characterised in that when the conveyor is stationary, the food piece is distributed onto the conveyor so that a half-perimeter of the food piece lies on a folding bar positioned above the conveyor, whose shape conforms to the said half-perimeter of the foodpiece, the folding bar is rotated 180 to lift up and fold over the half-perimeter so that it lies on the corresponding half-perimeter of the food piece, the folding bar is rotated in the reverse direction and the conveyor is advanced to transport the folded food piece.

The present invention also provides an apparatus for folding a food piece comprising a conveyor adapted to advance intermittently, a folding bar which conforms to the shape of a half-perimeter of a food piece and which is positioned above the conveyor, means for distributing a food piece onto the conveyor while the conveyor is stationary so that a half-perimeter of the food piece lies on the folding bar, means for rotating the folding bar 180° to lift up and fold over the half-perimeter of the food piece until the folding bar lies on the corresponding half-perimeter of the food piece, means for rotating the folding bar in a reverse direction, and means for advancing the conveyor to transport the folded food piece away.

DETAILED DESCRIPTION OF THE INVENTION

The food piece to be folded is generally flat and symmetrical and may be, for example, a pancake, crepe or omelette or a pie.

The food piece may be distributed onto the conveyor by means, e.g., a vacuum distribution head or a vacuum picking head, conveniently adapted to reciprocate. For example, when the food piece is a pancake, it may be picked up from the rotating table cavities of the machine in which the pancakes are made by a vacuum distribution head. In other types of pancake making machines where the pancakes are transported out of the machine on a belt, a vacuum picking head may be used to transfer the pancakes from the outfeed belt onto the folding bar.

The folding bar may be square or round in cross section and may be substantially corrugated or provided with projections so that the edge of the folded food piece has the appearance of being pressed by fingertips.

In some cases, it is desirable to place a filling onto the food piece before folding especially for pancakes or crepes. This may be achieved by means of a filling pipe fitted with an applicator and pump.

The movements of the various parts are synchronised so that when the conveyor is stationary, the food piece is distributed onto the conveyor, then the folding bar rotates 180 and after the folding bar has rotated in the reverse direction, the conveyor advances. If the food is filled, the filling is transmitted to the food piece before the folding takes place. After the conveyor has advanced a certain distance to transport the food piece from the folding area, it stops and the sequence is repeated.

The axis of rotation of the folding bar is horizontal and transverse to the direction of travel of the conveyor.

BRIEF DESCRIPTION OF THE DRAWINGS

The present invention is illustrated by way of example only, with reference to the accompanying drawings.

FIG. 3 represents a diagrammatic side section of a pancake placed on a folding device above a conveyor.

FIG. 4 represents a diagrammatic side section of a filling placed on the pancake.

FIG. 5 represents a diagrammatic side section of a pancake with a filling partially folded by the rotation of the folding bar.

FIG. 6 represents a diagrammatic side view of a folded pancake.

FIG. 7 represents the folding bar rotating in the reverse direction away from the pancake.

DETAILED DESCRIPTION OF THE DRAWINGS

Figure 1:
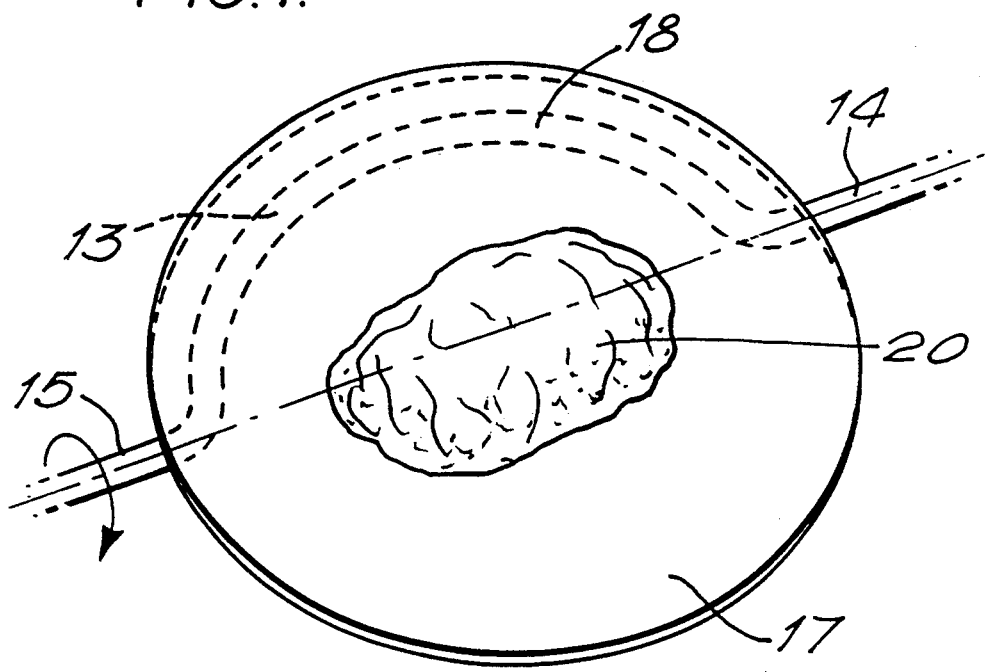
FIG. 1 represents a top plan diagram of a flat pancake resting on a folding bar.
Figure 2:
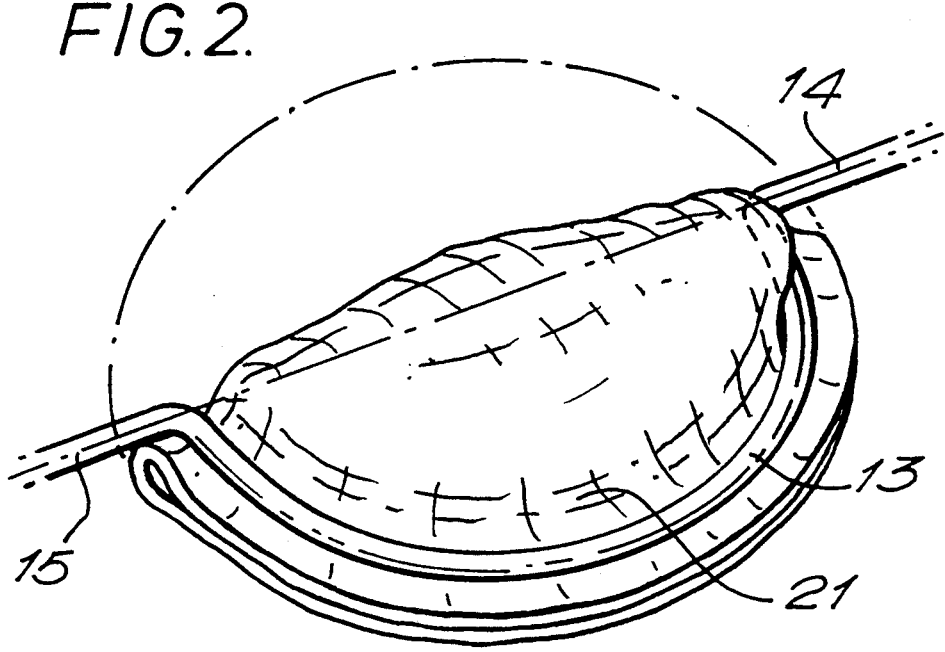
FIG. 2 represents a top plan diagram of a folded pancake where the folding bar in FIG. 1 has rotated 180.

The folding device comprises a conveyor belt 10 adapted to advance intermittently to the right, as shown in FIGS. 3 to 7, trained around rollers 11, 12, a folding bar 13 with ends 14, 15 adapted to reciprocate 180° and in operation, supports a portion of the food piece and rotates from an initial position parallel to the conveying surface in an arc about a bar axis of rotation formed by ends 14 and 15 to lift up and fold over a half portion of the food piece onto another half portion on the conveyor surface as represented by the arrows in FIGS. 1, 5, 6 and 7, is positioned to extend parallel to the conveying surface just above the conveying surface of conveyor belt 10.

A reciprocating vacuum distribution head 16 is positioned above the folding bar 13 and descends to distribute a flat pancake 17 which it has picked up from a rotating table cavity of a Lücon pancake making machine (not shown) onto the conveyor belt 10 when it is stationary so that the half-perimeter 18 overlies the folding bar 13. The vacuum head then ascends, a filling pipe 19 feeds a filling material 20 onto the pancake and then by means of a reciprocating motor (not shown) the folding bar 13 rotates in the arc 180° pushing up the half-perimeter 18 of the pancake and folding it over so that the half-perimeter 18 overlies the corresponding half-perimeter of similar shape to give a folded, filled pancake 21. The folding bar then rotates 180° in the reverse direction and the conveyor belt 10 advances to transport the folded pancake away before stopping. The vacuum distribution head 16 then descends again to distribute another flat pancake onto the conveyor and the process is repeated.

When the folding bar is corrugated in shape the joined edges of the folded pancakes have the appearance of having been pressed with the fingertips.

I claim:

1. A process for preparing folded food pieces comprising intermittently advancing a conveyor surface beneath a rotatable bar which has a perimeter shape which conforms to a half portion perimeter shape of a food piece to be folded and which is initially positioned above the conveyor surface to extend parallel to the conveyor surface, depositing a food piece onto the conveyor surface and onto the bar to obtain a deposited food piece on the conveyor surface and bar and then rotating the bar in an arc about an axis of rotation so that the bar lifts up and folds a half portion perimeter shape of the deposited food piece over onto the other half portion perimeter shape of the deposited food piece on the conveyor surface, rotating the bar to return the bar to its initial position and advancing the conveyor surface to transport the folded food piece.

2. A process according to claim 1 further comprising depositing a filling onto the deposited food piece and then rotating the bar thereby folding the food piece over the filling.

3. A process according to claim 1 wherein the food piece is deposited by a reciprocating vacuum distribution head.

4. A process according to claim 1 wherein the food piece is deposited by a vacuum picking head.

5. A process according to claim 1 wherein the bar has a corrugated surface for forming an outer edge of the folded food piece having an appearance of being pressed by fingertips when the bar is rotated to fold the food piece.

6. A process according to claim 1 wherein the deposited food piece has generally flat surfaces.

7. An apparatus for folding a food piece comprising:
a conveyor;
a rotatable bar positioned above a surface of the conveyor having a perimeter shape to enable the bar to support a food piece;
means for depositing a food piece onto the conveyor surface and onto the bar;
means for rotating the bar in an arc about an axis of rotation of the bar to lift up and fold a half portion of a food piece supported by the bar over onto a half portion of the food piece on the conveyor surface; and
means for advancing the conveyor intermittently to transport folded food pieces.

8. An apparatus according to claim 7 further comprising means for depositing a filling onto a food piece deposited on the bar and conveyor surface.

9. An apparatus according to claim 7 wherein the means for depositing the food piece is a reciprocating vacuum distribution head.

10. An apparatus according to claim 7 wherein the means for depositing the food piece is a vacuum picking head.

11. An apparatus according to claim 7 wherein the folding bar has a corrugated surface for forming an outer edge of the folded food piece having an appearance of being pressed by fingertips.

* * * * *